United States Patent [19]
Snitgen

[11] 3,779,332
[45] Dec. 18, 1973

[54] SAFETY IGNITION LOCK
[76] Inventor: Joseph D. Snitgen, 9656 Artesian, Detroit, Mich. 48228
[22] Filed: Oct. 20, 1969
[21] Appl. No.: 867,828

[52] U.S. Cl....................... 180/112, 70/255, 70/455, 200/50 A
[51] Int. Cl.............................................. B60r 21/02
[58] Field of Search.................. 180/111, 112, 113, 180/82; 70/455, 254, 255, 257; 200/42, 44, 50 A

[56] References Cited
UNITED STATES PATENTS

| | | | |
|---|---|---|---|
| 1,466,758 | 9/1923 | Rowntree | 180/111 |
| 1,746,214 | 2/1930 | Davidson et al. | 70/257 |
| 2,010,736 | 8/1935 | Scott | 180/111 |
| 2,944,123 | 7/1960 | Gaida | 200/44 |
| 3,104,124 | 9/1963 | Beck | 180/112 X |
| 3,246,495 | 4/1966 | Crumb | 70/455 |

Primary Examiner—Kenneth H. Betts
Assistant Examiner—John P. Silverstrim
Attorney—Harness, Dickey & Pierce

[57] ABSTRACT

An automotive anti-theft device wherein the ignition switch is positioned in the driver's door and is interrelated with the door locking mechanism. The interrelationship between the door locking mechanism and the ignition switch is such that the key cannot be inserted in the ignition switch until the door is locked and the door cannot be unlocked until the key is removed.

8 Claims, 4 Drawing Figures

PATENTED DEC 18 1973

3,779,332

INVENTOR.
Joseph D. Snitgen
BY
Harness, Dickey & Pierce
ATTORNEYS.

SAFETY IGNITION LOCK

BACKGROUND OF THE INVENTION

This invention relates to a safety ignition lock and more particularly to an improved vehicle locking arrangement that reduces the possibility of theft and provides related safety features.

It is common knowledge that a large percentage of the thefts of motor vehicles results from the operator's leaving the ignition key in the ignition when the vehicle is left unattended. Devices have been proposed such as warning buzzers for providing an audible warning when the door is opened and the key is left in the ignition. Such devices do not, however, positively insure that the igntiion key will be removed from the ignition switch when the operator leaves the vehicle unattended. Although devices have been proposed for otherwise insuring removal of the ignition key, these devices are genrally complicated and expensive.

It is, therefore, a principal object of this invention to provide an improved device for insuring that the ignition key will not be left in the ignition switch when the vehicle is left unattended.

It is another object of the invention to provide an improved safety ignition lock.

It is a further object of the invention to provide a means for interrelating the ignition switch with the door locking mechanism so that the driver's door cannot be opened unless the ignition key is removed from the lock.

It is generally acknowledged that the possibility of the vehicle doors springing open upon impact is reduced if the doors are locked when the vehicle is being operated. In addition, for the safety of the vehicle occupants and the driver, it is desirable that the doors be locked at all times when the vehicle is being operated. Although various mechanisms have been proposed for insuring that the door locks are locked when the vehicle is being operated, these mechanisms are extremely complicated since they have, for the most part, been automatic in operation. In addition, such automatic door locks offer the disadvantage that they may, at times, effect locking of the doors under circumstances when the doors should not be locked.

It is, therefore, a further object of this invention to provide a door locking mechanism that insures that the door is locked when the vehicle is being operated.

SUMMARY OF THE INVENTION

A feature of this invention is adapted to be embodied in a motor vehicle having an ignition switch and a door lock. In this combination, the invention comprises the provision of means for precluding closing of the ignition switch until the door is locked.

A further feature of the invention is also adapted to be embodied in a motor vehicle having an ignition switch and a door lock. In connection with this feature, the invention comprises the provision of means for precluding opening of the door until the key is removed from the ignition switch.

DETAILED DESCRIPTION OF THE PREFERRED EMBODIMENT

Figure 1:
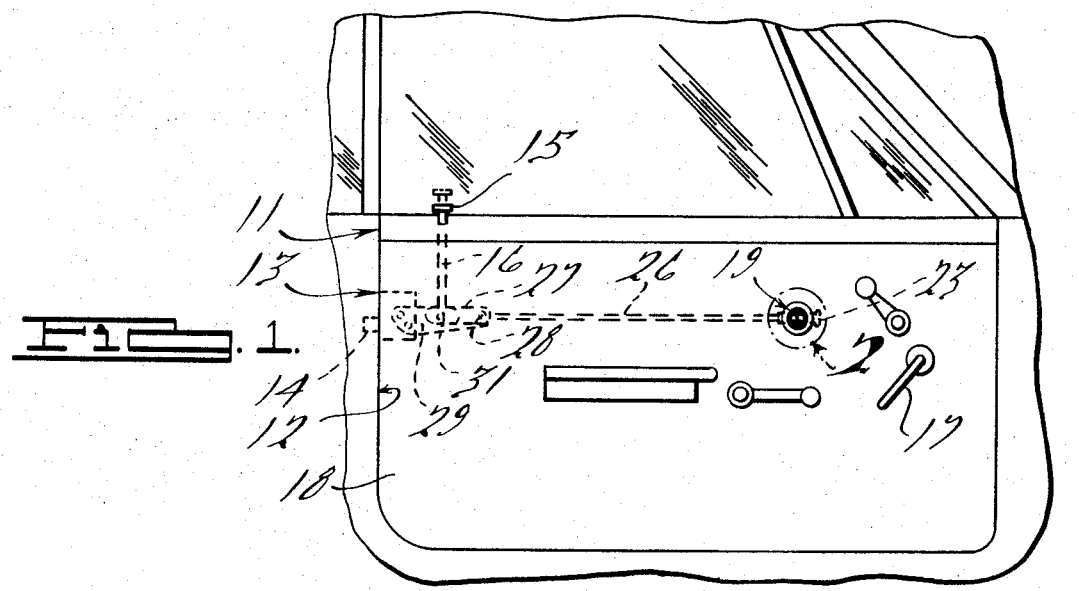
FIG. 1 is a side elevational view, taken from the interior, of a portion of a motor vehicle embodying this invention.

FIG. 1 illustrates the inside of a motor vehicle as viewed substantially from the driver's seat. The driver's door is indicated generally by the reference numeral 11 and the portion of the body that defines the doorway opening is indicated generally by the reference numeral 12. Carried within the driver's door 11 is a lock mechanism, indicated generally by the reference numeral 13, that coacts with a striker plate 14 carried on the doorway jamb. The lock mechanism 13 includes a button 15 that is carried at the upper end of the door frame and which is movable between a locked position, as shown in the solid line view in FIG. 1, and an unlocked position, as shown in the dotted line position. The button 15 is connected by means of linkage 16 to the lock mechanism 13 in a known manner. In addition, an interior door handle 17 is supported upon a door panel 18 and is connected to the lock mechanism 13 in any known manner (not shown). As is well known in most present day door locking mechanisms, the handle 17 is inoperative to release the lock mechanism 13 until the button 15 is pulled to its unlocked position.

Figure 4:
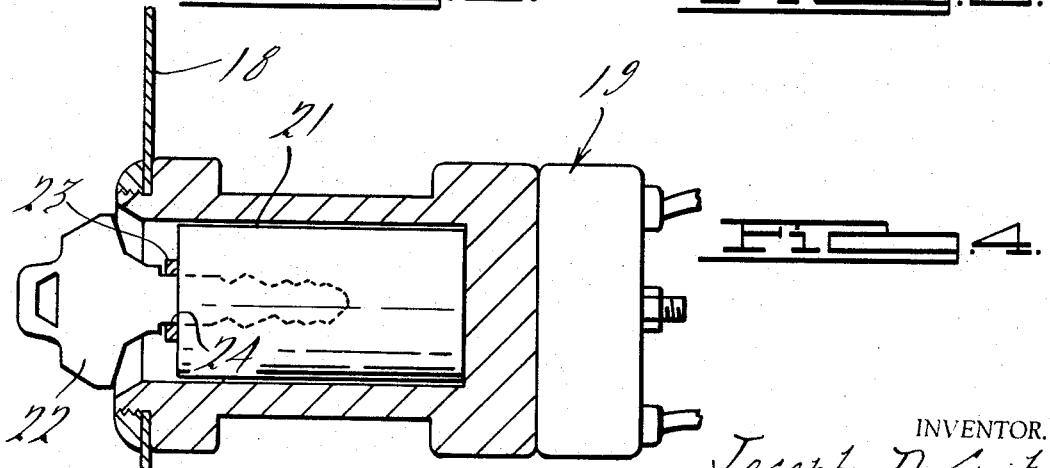
FIG. 4 is a cross-sectional view taken along the line 4—4 of FIG. 2.

A key operated ignition switch, indicated generally by the reference numeral 19, is supported upon a door panel 18 and within the interior of the door. The ignition switch 19 includes a tumbler mechanism 21 (FIG. 4) that is adapted to be operated by a key 22 in a known manner. A safeguard plate 23 is slidably supported by the ignition switch mechanism 19 and is provided with an aperture 24 that is adapted to register, at times, with an aperture 25 of the tumbler mechanism 21 that receives the key 22. The safeguard plate 23 is connected by means of a link 26 to one link 27 of a toggle mechanism, by means of a pivot pin 28. The link 27 is pivotally connected to the link 16 and to a second toggle link 29 by means of a pivot pin 31. The toggle link 29 is, in turn, connected to the lock mechanism 13 so that it will operate the lock mechanism 13 is response to movement of the button 15.

When the button 15 is in its depressed position as shown in FIG. 1, the toggle links 27 and 29 are aligned and the lock mechanism 13 is precluded from operation by means of the door handle 17 in the previously known manner. In addition, the toggle link 27 acting through the link 26 has moved the safeguard plate 23 so that its aperture 24 registers with the key receiving opening 25. The ignition key 22 may then be put in place and turned so as to operate the motor vehicle.

Figures 2, 3:
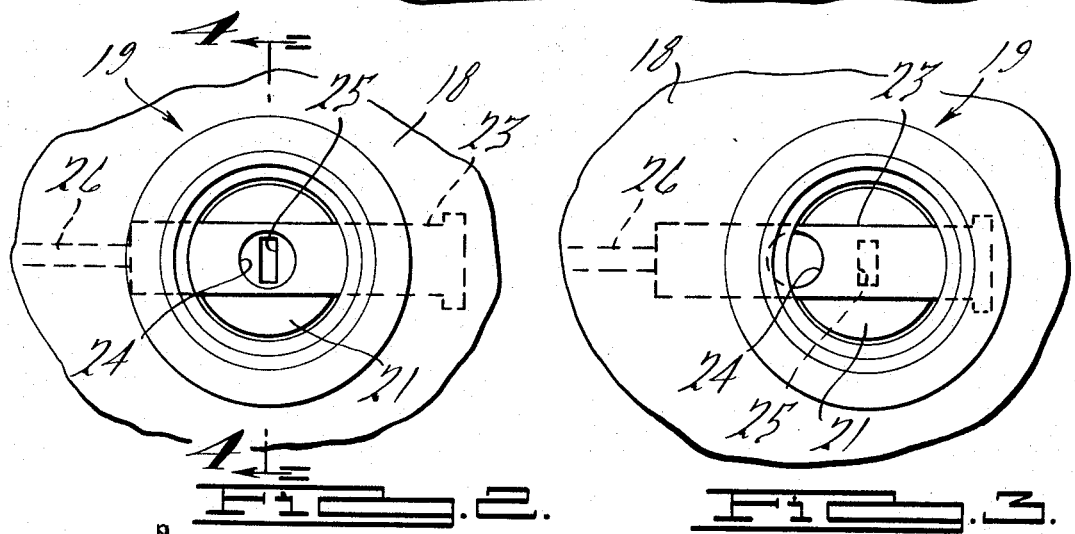
FIG. 2 is an enlarged view of the area encompassed by the circle 2 in FIG. 1.
FIG. 3 is a view, in part similar to FIG. 2, showing the mechanism in another position.

When the button 15 is pulled upwardly to release the lock mechanism 13 so that it can be operated by the handle 17, the toggle links 27 and 29 will be pivoted. As has been noted, this will make operation of the locking mechanism 13 by the handle 17 possible. In addition, the safeguard plate 23 is moved to the position shown in FIG. 3 so that the tumbler aperture 25 is no longer accessible.

It should be apparent that when the operator enters the vehicle the door 11 must be closed and the button 15 depressed to lock the lock mechanism 13 before the ignition key 22 can be inserted in the ignition switch 19. Thus, it is insured that the door 11 is locked before the vehicle can be driven. In addition, if the driver attempts to release the button 15 by pulling it upwardly before the key 22 is removed, the safeguard plate 23 cannot be slid from the position shown in FIG. 2 to the position shown in FIG. 3. Thus, it will be impossible to unlock the door before the ignition key 22 is removed. This insures that the ignition key will not be inadvertently left in the ignition switch 19.

What is claimed is:

1. In a motor vehicle having a key operated ignition switch and a door lock operable between a locked position and a released position when a key is not present in said ignition switch, the improvement comprising means for precluding closing of said ignition switch until said door lock is locked, wherein the means for precluding closing of the switch comprises means for precluding entry of a key into the switch.

2. The device as set forth in claim 1 wherein the means for precluding the entry of the key into the switch includes linkage means for interconnecting the door lock with said means.

3. The device as set forth in claim 2 wherein the ignition switch and the door lock are carried by the driver's door of the vehicle.

4. In a motor vehicle having a key operated ignition switch and a door lock operable between a locked position and a released position when a key is not present in said ignition switch, the improvement comprising means for precluding closing of said ignition switch until said door lock is locked, wherein the means for precluding closing of the ignition switch until the door lock is locked further includes means for requiring removal of the key from the ignition switch before the door lock can be unlocked.

5. The device as set froth in claim 4 wherein the means for precluding closing of the switch until the door is locked and unlocking of the door until the key is removed includes means for blocking the key receiving opening of the switch and linkage means interconnecting said blocking means with said door lock.

6. The device as set forth in claim 5 further including a driver's door, the ignition switch and the lock being carried by the driver's door.

7. In a motor vehicle having a key operated ignition switch and a door lock, the improvement comprising blocking means adapted to engage a key in said ignition switch and linkage means interconnecting said door lock and said blocking means for moving said blocking means into engagement with a key in said ignition switch when an attempt is made to move said door lock from its locked position to its released position for insuring removal of the key from said ignition switch before said door lock is released.

8. The device as set forth in claim 7 further including an operator's door, said ignition switch and said door lock being carried by said door.

* * * * *